(12) United States Patent
Lee

(10) Patent No.: US 12,537,209 B2
(45) Date of Patent: Jan. 27, 2026

(54) METHOD FOR DIAGNOSING DETERIORATION OF FUEL CELL AND METHOD AND SYSTEM FOR PREVENTING DETERIORATION OF FUEL CELL USING THE SAME

(71) Applicants: HYUNDAI MOTOR COMPANY, Seoul (KR); KIA CORPORATION, Seoul (KR)

(72) Inventor: Hyun Seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 778 days.

(21) Appl. No.: 17/859,678

(22) Filed: Jul. 7, 2022

(65) Prior Publication Data

US 2023/0037634 A1 Feb. 9, 2023

(30) Foreign Application Priority Data

Aug. 9, 2021 (KR) ........................ 10-2021-0104822

(51) Int. Cl.
| | | |
|---|---|---|
| *H01M 8/04664* | (2016.01) | |
| *H01M 8/04089* | (2016.01) | |
| *H01M 8/04302* | (2016.01) | |
| *H01M 8/04537* | (2016.01) | |
| *H01M 8/04746* | (2016.01) | |
| *H01M 8/04828* | (2016.01) | |
| *H01M 8/04858* | (2016.01) | |
| *G01R 19/00* | (2006.01) | |

(52) U.S. Cl.
CPC .... *H01M 8/04671* (2013.01); *H01M 8/04097* (2013.01); *H01M 8/04302* (2016.02); *H01M 8/04552* (2013.01); *H01M 8/04753* (2013.01); *H01M 8/04835* (2013.01); *H01M 8/04902* (2013.01); *G01R 19/00* (2013.01)

(58) Field of Classification Search
CPC .......... H01M 8/04298; H01M 8/0435; H01M 8/04302; H01M 8/04097
See application file for complete search history.

(56) References Cited

U.S. PATENT DOCUMENTS

2006/0093880 A1* 5/2006 Igarashi .............. H01M 8/0435
429/513

FOREIGN PATENT DOCUMENTS

AU 2011259799 A1 * 7/2012 ........ H01M 8/04679
KR 10-1776390 B1 9/2017

* cited by examiner

*Primary Examiner* — Lam S Nguyen
(74) *Attorney, Agent, or Firm* — MCDONNELL BOEHNEN HULBERT & BERGHOFF LLP

(57) ABSTRACT

A fuel cell deterioration prevention system includes a cell voltage stability determination unit determining cell voltage stability according to a preset operating condition, a fuel cell deterioration diagnosing unit diagnosing deterioration of a fuel cell by changing and controlling a control variable pre-selected according to an operating condition and monitoring a resultant change in the cell voltage of the fuel cell, and a deterioration avoidance operation control unit performing a deterioration avoidance operation based on a diagnosis result of the fuel cell deterioration diagnosing unit.

18 Claims, 12 Drawing Sheets

METHOD FOR DIAGNOSING DETERIORATION OF FUEL CELL AND METHOD AND SYSTEM FOR PREVENTING DETERIORATION OF FUEL CELL USING THE SAME

CROSS REFERENCE TO RELATED APPLICATIONS

The present application claims priority to Korean Patent Application No. 10-2021-0104822, filed Aug. 9, 2021, the entire contents of which is incorporated herein for all purposes by this reference.

BACKGROUND

Field

The present disclosure relates to a technology for preventing deterioration of a fuel cell, and more specifically, to a technology for diagnosing and preventing deterioration of a fuel cell for diagnosing a stack voltage stability state for each operating condition of a fuel cell system, and accordingly, diagnosing the deterioration of the fuel cell and performing avoidance control.

Description of the Related Art

A fuel cell is an electrochemical device that uses an electrochemical reaction between hydrogen and oxygen to generate electrical energy or electrical power. In particular, in a polymer electrolyte fuel cell system widely applied to vehicles, since water acts as a medium for transferring hydrogen ions (H+) to an electrode membrane between a cathode and an anode, maintaining the moisture content of an electrolyte membrane above a certain level is directly related to fuel cell performance.

For example, in the case of a dry condition in which water is insufficient, the moisture content of an electrolyte membrane decreases, and thus the resistance of an electrode increases, resulting in deterioration in fuel cell performance, and in the case of a flooding condition with too much moisture, water is condensed in a channel where air and hydrogen are voided at a cathode an anode, and thus reaction gas is not normally supplied to the electrode, resulting in a sharp decrease in a cell voltage of a fuel cell. When the fuel cell is continuously operated under the aforementioned dry condition or flooding condition, deterioration of the fuel cell is accelerated.

The fuel cell inevitably undergoes irreversible deterioration such as physical deformation as the usage time increases, and operation characteristics such as dry conditions and flooding conditions as described above may change according to such deterioration.

Therefore, in order to improve the durability and efficiency of the fuel cell by avoiding the operating conditions that accelerate the deterioration of the fuel cell, an accurate diagnosis of the current deterioration state of the fuel cell is required, and new operating conditions should be set accordingly.

Korea Patent Registration No. 10-1776390 (hereinafter, referred to as Document 1) discloses a technology for improving the durability of a fuel cell by diagnosing irreversible deterioration such as physical deformation of the fuel cell and appropriately controlling the humidity of the fuel cell according to a magnitude of a diagnosed deterioration degree.

However, in Document 1, a separate relative humidity estimation function is required for a vehicle, and there is a limitation in that it is absolutely necessary to measure a voltage at a specific relative humidity. In addition, since cell deterioration is diagnosed based on a specific relative humidity standard, there is a problem in that a cell deterioration standard lacks representativeness in determining current cell performance deterioration. In particular, in the case of Document 1, there has been a limitation in that it is not possible to identify dry or flooding that causes deterioration in cell performance.

The matters described as the background art above are only for improving the understanding of the background of the present disclosure, and should not be taken as an acknowledgment that they correspond to the related art already known to those of ordinary skill in the art.

SUMMARY

The present disclosure is proposed to solve these problems and aims to provide a technology for diagnosing a voltage stability state of a stack for each operating condition using a variable controllable in vehicle components, and preventing fuel cell deterioration according to a result of the diagnosing.

In particular, another objective of the present disclosure is to identify a cause and location of cell performance deterioration in preventing fuel cell deterioration, and to provide specific diagnostic results such as reversible/irreversible deterioration.

Also, another objective of the present disclosure is to increase the durability of a fuel cell system by ensuring the best water balance in a cell and maintaining voltage stability by performing an appropriate deterioration avoidance operation according to a diagnosis result for fuel cell deterioration.

A method of diagnosing deterioration of a fuel cell according to the present disclosure for achieving the objective described above includes determining whether a fuel cell system has entered a preset operating condition, determining cell voltage stability for each operating condition; and when it is determined that a cell voltage is not stable, diagnosing the deterioration of the fuel cell by changing and controlling a control variable selected according to an operating condition from among a control variable group including a supply air recirculation amount, a cathode target stoichiometry ratio (SR), humidifier target temperature, and supply air pressure and monitoring a resultant change in the cell voltage of the fuel cell.

A method of preventing deterioration of a fuel cell according to another embodiment of the present disclosure further includes, after the diagnosing of the deterioration of the fuel cell, performing a deterioration avoidance operation according to a result of the diagnosing of the deterioration of the fuel cell.

The determining of the cell voltage stability may include at least one operation of: (i) determining the cell voltage stability from a difference between an average cell voltage and a minimum cell voltage at a time point at which a first current density is reached within a first reference time after starting the fuel cell system; (ii) when the fuel cell system is operated above a first reference output for more than a second reference time, calculating a current average cell voltage in a corresponding section, and determining the cell voltage stability from a difference between the calculated current average cell voltage and an average cell voltage in an identical section during a previous operation; and (iii) when the fuel cell system is repeatedly operated to increase from a second current density to a third current density and decrease from the third current density to the second current density within a third reference time, determining the cell voltage stability from a difference between a minimum cell voltage at a fourth current density when a current density decreases and a minimum cell voltage at the fourth current density when the current density increases.

Also, in the method of diagnosing the deterioration of the fuel cell according to the present disclosure, when it is determined that the cell voltage is unstable via (i), in the diagnosing of the deterioration of the fuel cell, a flow rate of cathode supply air may be increased to identify whether the minimum cell voltage is restored within a stable range, and a diagnosis result including at least one piece of deterioration information including a cause of deterioration in fuel cell performance, location of occurrence, and whether the deterioration is irreversible may be provided.

When it is determined that the cell voltage is unstable via (ii), in the diagnosing of the deterioration of the fuel cell, whether the average cell voltage is increased within a stable range may be identified while increasing a humidification amount of cathode supply gas, increasing cathode supply gas pressure, and decreasing a hydrogen recirculation ratio are sequentially performed, and a diagnosis result including at least one piece of deterioration information including a cause of deterioration in fuel cell performance, location of occurrence, and whether the deterioration is irreversible may be provided.

When it is determined that the cell voltage is unstable via (iii), in the diagnosing of the deterioration of the fuel cell, whether the minimum cell voltage is increased within a stable range may be identified while decreasing a humidification amount of cathode supply gas, increasing cathode supply gas pressure, and decreasing a hydrogen recirculation ratio are sequentially controlled, and a diagnosis result including at least one piece of deterioration information including a cause of deterioration in fuel cell performance, location of occurrence, and whether the deterioration is irreversible may be provided.

Also, in the method of preventing the deterioration of the fuel cell, when it is determined that the cell voltage is unstable via (i), in the diagnosing of the deterioration of the fuel cell, whether the minimum cell voltage is restored within a stable range may be identified while a total flow rate of cathode supply air is increased by recirculating some of cathode outlet air, and when the minimum cell voltage is restored within the stable range, whether the minimum cell voltage remains within the stable range may be identified while the total flow rate of the cathode supply air is restored, and in the performing of the deterioration avoidance operation, only when the minimum cell voltage does not remain within the stable range, the deterioration avoidance operation for making a change into a temporary supercharging state by increasing a target SR of air supplied to a cathode under an operating condition of (i), may be performed.

In the diagnosing of the deterioration of the fuel cell, when the minimum cell voltage is not restored within the stable range by recirculating the some of the cathode outlet air, the target SR of the air supplied to the cathode may be increased to reidentify whether the minimum cell voltage is restored within the stable range, and in the performing of the deterioration avoidance operation, according to a result of the reidentifying, when the minimum cell voltage is restored, the deterioration avoidance operation for making a change into an air supercharging condition increased to a preset target SR may be performed, and when the minimum cell voltage is not restored, output of the fuel cell may be controlled to be limited.

When it is determined that the cell voltage is unstable via (ii), in the diagnosing of the deterioration of the fuel cell, the humidifier target temperature may be increased to identify whether the current average cell voltage is increased within a stable range, and in the performing of the deterioration avoidance operation, when the current average cell voltage is increased within the stable range, the deterioration avoidance operation may be performed to temporarily increase an air humidification amount under an operating condition exceeding reference temperature and second reference output.

In the diagnosing of the deterioration of the fuel cell, when the current average cell voltage is not increased within the stable range by increasing the humidifier target temperature, a pressure of cathode supply air may be increased to reidentify whether the current average cell voltage is increased within the stable range, and when the current average cell voltage is increased within the stable range as a result of the reidentifying, a change in a water level of a water trap on an anode side may be identified, and in the performing of the deterioration avoidance operation, when the water level of the water trap is increased, an anode hydrogen recirculation ratio may be changed and controlled to decrease, and when there is no change in the water level of the water trap, the supply air pressure may be controlled to increase while air humidification temperature under an operating condition exceeding third reference output is maintained.

In the diagnosing of the deterioration of the fuel cell, when the current average cell voltage is not increased within the stable range as the result of the reidentifying, whether the current average cell voltage is increased within the stable range may be reidentified while some of cathode outlet air is recirculated to increase a total flow rate of the cathode supply air, and when the current average cell voltage is increased within the stable range, whether the current average cell voltage remains within the stable range may be identified while the total flow rate of the cathode supply air is restored, and in the performing of the deterioration avoidance operation, only when the current average cell voltage does not remain within the stable range, under an operating condition of (i), a target SR of air supplied to a cathode may be temporarily increased to perform the deterioration avoidance operation to make a change into a temporary supercharging state.

In the diagnosing of the deterioration of the fuel cell, when the current average cell voltage is not increased within the stable range by recirculating the some of the cathode outlet air, the target SR of the air supplied to the cathode may be increased to reidentify whether the current average cell voltage is increased within the stable range, and in the performing of the deterioration avoidance operation, when the current average cell voltage is increased within the stable range according to the increasing of the target SR of the air, the deterioration avoidance operation for making a change into an air supercharging condition increased to a preset target SR may be performed, and when the current average cell voltage is not increased, output of the fuel cell may be controlled to be limited.

When it is determined that the cell voltage is unstable via (iii), in the diagnosing of the deterioration of the fuel cell, the humidifier target temperature may be decreased to identify whether the minimum cell voltage is increased within a stable range, and in the performing of the deterioration avoidance operation, when the minimum cell voltage is increased within the stable range, an air humidification amount under an operating condition exceeding fourth reference output may be changed and controlled to temporarily decrease.

In the diagnosing of the deterioration of the fuel cell, when the minimum cell voltage is not increased within the stable range by decreasing the humidifier target temperature, a pressure of cathode supply air may be increased to reidentify whether the minimum cell voltage is increased within the stable range, and when the minimum cell voltage is increased within the stable range as a result of the reidentifying, a change in a water level of a water trap on an anode side may be identified, and in the performing of the deterioration avoidance operation, when the water level is increased, an anode hydrogen recirculation ratio may be changed and controlled to decrease, and when there is no change in the water level, the supply air pressure may be controlled to increase while air humidification temperature under an operating condition exceeding third reference output is maintained.

In the diagnosing of the deterioration of the fuel cell, when the minimum cell voltage is not increased within the stable range as the result of the reidentifying, whether the minimum cell voltage is increased within the stable range may be reidentified while some of cathode outlet air is recirculated to increase a total flow rate of the cathode supply air, and when the minimum cell voltage is increased within the stable range, whether the minimum cell voltage remains within the stable range may be identified while the total flow rate of the cathode supply air is restored, and in the performing of the deterioration avoidance operation, only when the minimum cell voltage does not remain within the stable range, the deterioration avoidance operation for making a change into a temporary supercharging state by temporarily increasing a target SR of air supplied to a cathode under an operating condition of (i) may be performed.

In the diagnosing of the deterioration of the fuel cell, when the minimum cell voltage is not increased within the stable range by recirculating the some of the cathode outlet air, the target SR of the air supplied to the cathode may be increased to reidentify whether the minimum cell voltage is increased within the stable range, and in the performing of the deterioration avoidance operation, when the minimum cell voltage is increased within the stable range according to the increasing of the target SR of the air, the deterioration avoidance operation for making a change into an air supercharging condition increased to a preset target SR may be performed, and when the minimum cell voltage is not increased, output of the fuel cell may be controlled to be limited.

A fuel cell deterioration prevention system according to the present disclosure includes a cell voltage stability determination unit configured to determine cell voltage stability according to a preset operating condition, a fuel cell deterioration diagnosing unit including information on control variables to be changed and controlled when a cell voltage is unstable according to an operating condition among a control variable group including a supply air recirculation amount, a cathode target SR, humidifier target temperature, and supply air pressure, and configured to diagnose deterioration of a fuel cell by changing and controlling a control variable pre-selected according to an operating condition when the cell voltage stability determination unit determines that the cell voltage is unstable and monitoring a resultant change in the cell voltage of the fuel cell; and a deterioration avoidance operation control unit configured to perform a deterioration avoidance operation based on a diagnosis result of the fuel cell deterioration diagnosing unit.

The fuel cell deterioration prevention system may further include a data storage unit storing average cell voltage and minimum cell voltage information, which are recorded during operation of a fuel cell system from a preceding day to a current time, for each operating state.

The cell voltage stability determination unit may be configured to determine the cell voltage stability based on the average cell voltage and minimum cell voltage information stored in the data storage unit.

The fuel cell deterioration diagnosing unit may provide a diagnosis result including at least one piece of deterioration information including a cause of deterioration in full cell performance, location of occurrence, and whether the deterioration is irreversible according to whether a cell voltage stability condition of the fuel cell required according to the operating condition is restored as a result of the changing and controlling of the control variable.

According to a method and system for preventing deterioration of a fuel cell stack of the present disclosure, it is possible to diagnose cell voltage stability by sampling a stack output voltage result according to each operating condition while driving a vehicle without using a separate diagnostor for deterioration-diagnosing logic using variables controllable in vehicle components.

In addition, according to a stack voltage stability diagnosis result, it is possible to temporarily/permanently feedback operating condition changes, ensure the best water balance in a cell, and maintain voltage stability to prevent stack output limitation and stack deterioration.

In addition, since stack voltage stability diagnosis can be managed while being updated during a driving process at daily intervals, deterioration avoidance operation is possible in real time, thereby increasing the durability of a fuel cell system.

DETAILED DESCRIPTION

Hereinafter, a method and system for preventing deterioration of a fuel cell stack according to various embodiments of the present disclosure will be described in detail with reference to the accompanying drawings.

Figure 1:
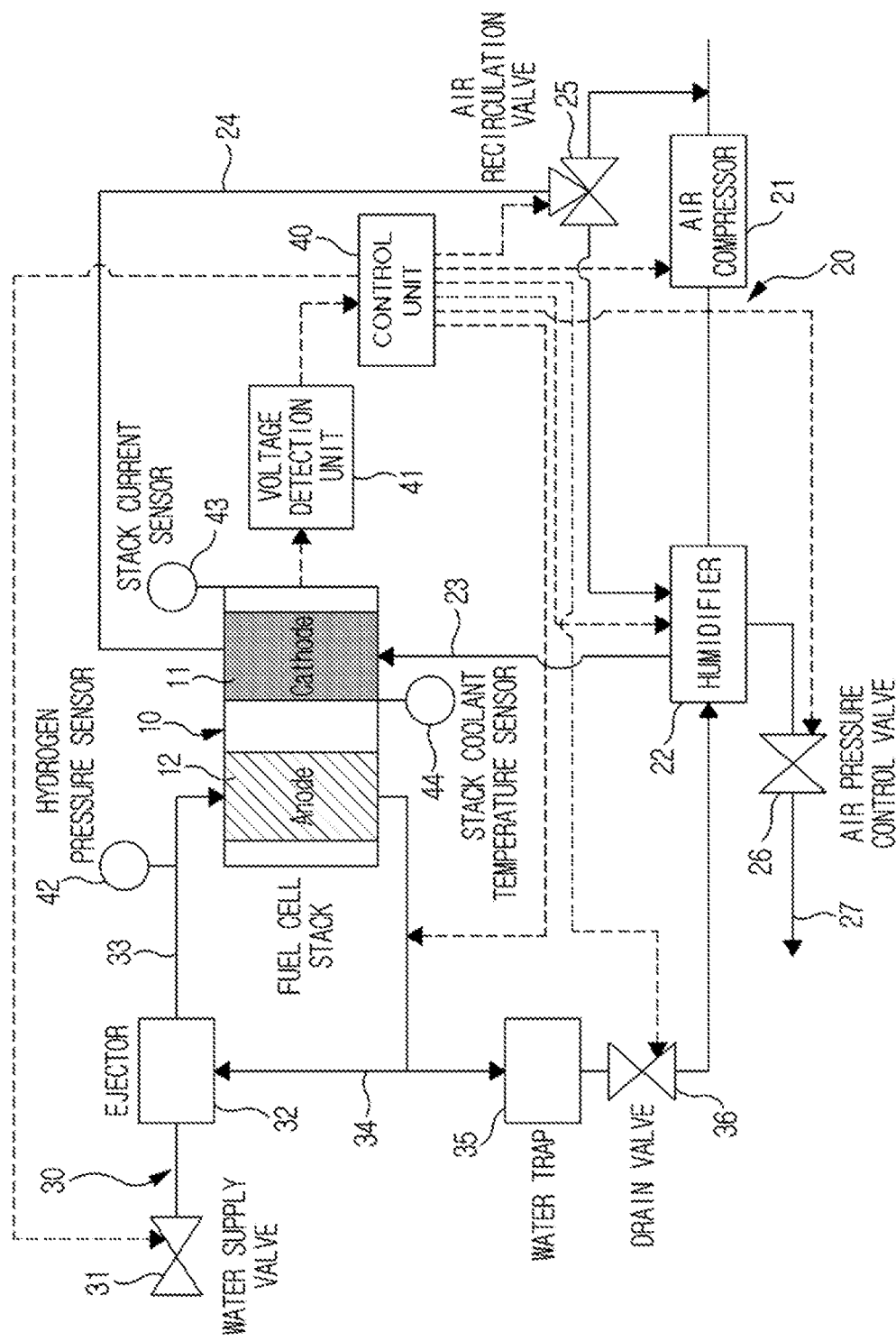
FIG. 1 is a configuration diagram of a fuel cell system to which a method of diagnosing deterioration of a fuel cell and a method of preventing deterioration of a fuel cell according to an embodiment of the present disclosure may be applied.

FIG. 1 shows a fuel cell system to which a method of diagnosing deterioration of a fuel cell stack and a method of preventing deterioration of a fuel cell stack using the same, according to an embodiment of the present disclosure.

Referring to FIG. 1, an air supply system 20 for supplying air is connected to a cathode 11 of a fuel cell stack 10, and a hydrogen supply system 30 for supplying hydrogen is connected to an anode 12 thereof.

The air supply system 20 may include an air compressor 21 and a humidifier 22, wherein the air compressor 21 sucks in external air and compresses and transmits the external air to the humidifier 22, and the humidifier 22 humidifies so that the compressed air has an appropriate humidity. Air that has passed through the humidifier 22 reacts with hydrogen on the anode 12 side while passing through the cathode 11 through an air supply line 23. As the humidifier 22, a membrane humidifier for moisture exchange between wet gas emitted after fuel cell reaction and air supplied from outside air may be used. To this end, air emitted from an outlet of the cathode 11 may be re-supplied to the humidifier 22 side through a second air supply line 24. In this case, an air recirculation valve 25 may be installed on the second air supply line 24. The air recirculation valve 25 may be configured as a three-way valve, and by controlling an opening degree of the air recirculation valve 25, a total air flow rate may be increased by recirculating some of cathode outlet air upstream of the humidifier 22. Also, an air pressure control valve 26 is installed on one side of the humidifier 22, and wet air that has not participated in humidification is emitted to the outside along an air exhaust line 27 through the air pressure control valve 26. The air pressure control valve 26 may control pressure of air supplied to the cathode 11 by controlling a rotation speed of the air compressor 21 or by independently controlling a valve opening degree.

In the hydrogen supply system 30, hydrogen supplied through a hydrogen supply valve 31 is supplied to the anode 12 side through an ejector 32. A pressure sensor 42 for detecting a pressure may be installed at front and rear ends of the ejector 32.

Meanwhile, some hydrogen that has not participated in a reaction among the hydrogen supplied to the anode 12 may be recirculated to a front end portion of the anode 12 through a hydrogen recirculation line 34 and supplied to the anode 12 again. In this case, condensed water in the anode 12 is discharged together with the some hydrogen that has not participated in the reaction, and a water trap 35 for collecting the condensed water is installed at an outlet of the anode 12 side.

A water level detection sensor (not shown) for detecting a water level of the water trap 35 is installed in the water trap 35, and when it is identified through the water level detection sensor that a water level of condensed water is greater than or equal to a threshold, the condensed water may be discharged to the outside through a drain valve 36 at a lower end of the water trap 35. In this case, the condensed water discharged through the drain valve 36 may be discharged to the outside along the air exhaust line 27, and may be transferred to the humidifier 22 side of the air supply system 20 and utilized for humidification as shown in FIG. 1.

A control unit 40 controls an operation of the fuel cell system from information obtained from various sensors 42, 43, and 44 and a voltage detection unit 41 in the fuel cell system, and collectively controls operable components in the fuel cell system, such as the air compressor 21 and various valves 25, 26, 31, and 36.

Figure 2:
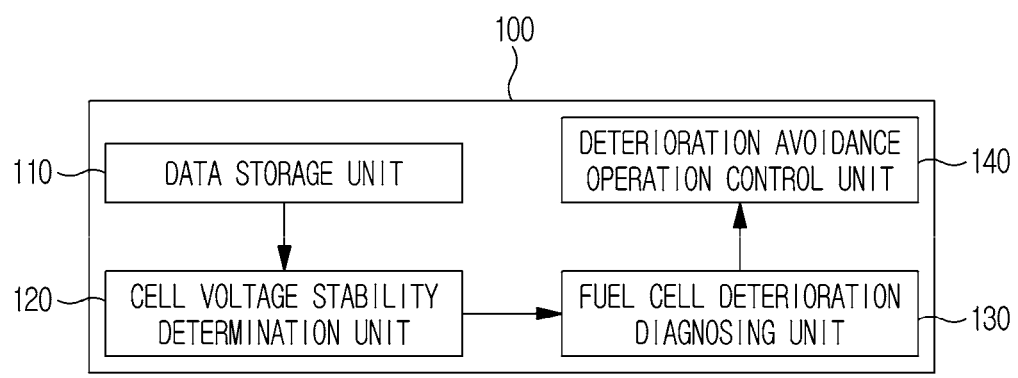
FIG. 2 is a block diagram showing a schematic configuration of a fuel cell deterioration prevention system according to an embodiment of the present disclosure.

FIG. 2 is a block diagram showing a schematic configuration of a fuel cell deterioration prevention system according to an exemplary embodiment of the present disclosure. The fuel cell deterioration prevention system of FIG. 2 may be applied to the fuel cell system as shown in FIG. 1, and is configured to diagnose a state of a stack using a controllable variable and control fuel cell deterioration prevention according to a result of the diagnosing. A system configuration of FIG. 2 may be a part of the control unit 40 of FIG. 1, and may be applied as a configuration separated from the control unit 40 of FIG. 1.

As shown in FIG. 2, a fuel cell deterioration prevention system 100 according to an exemplary embodiment of the present disclosure may identify cell voltage stability for each operating condition of a vehicle, and according to a result thereof, may diagnose deterioration in fuel cell performance and optionally perform deterioration avoidance operation. To this end, the fuel cell deterioration prevention system 100 may include a data storage unit 110, a cell voltage stability determination unit 120, a fuel cell deterioration diagnosing unit 130, and a deterioration avoidance operation control unit 140.

The data storage unit 110 may store average cell voltage and minimum cell voltage data, which are separately recorded according to an operation time point. The data storage unit 110 may be a data buffer in a processor for processing an operation or a memory device provided separately from the processor, such as flash memory.

The cell voltage stability determination unit 120 may identify whether a preset operating condition has been entered, and when a specific operating condition has been entered, may obtain cell voltage data of the fuel cell system regarding the corresponding operating condition from the data storage unit 110, and identify cell voltage stability of a fuel cell therefrom.

When the cell voltage stability determination unit 120 determines that a determination result is abnormal, the fuel cell deterioration diagnosing unit 130 may diagnose deterioration of the fuel cell. The fuel cell deterioration diagnosing unit 130 may be configured to estimate a cause of the deterioration of the fuel cell according to an operating condition, and determine whether the deterioration is reversible or irreversible.

As a result of the diagnosing by the fuel cell deterioration diagnosing unit 130, when it is determined that a deterioration avoidance operation is necessary, the deterioration avoidance operation control unit 140 may control to perform an optimal stack deterioration avoidance operation by temporarily or permanently changing and controlling an operating condition for a controllable variable in the fuel cell system.

Figure 3:
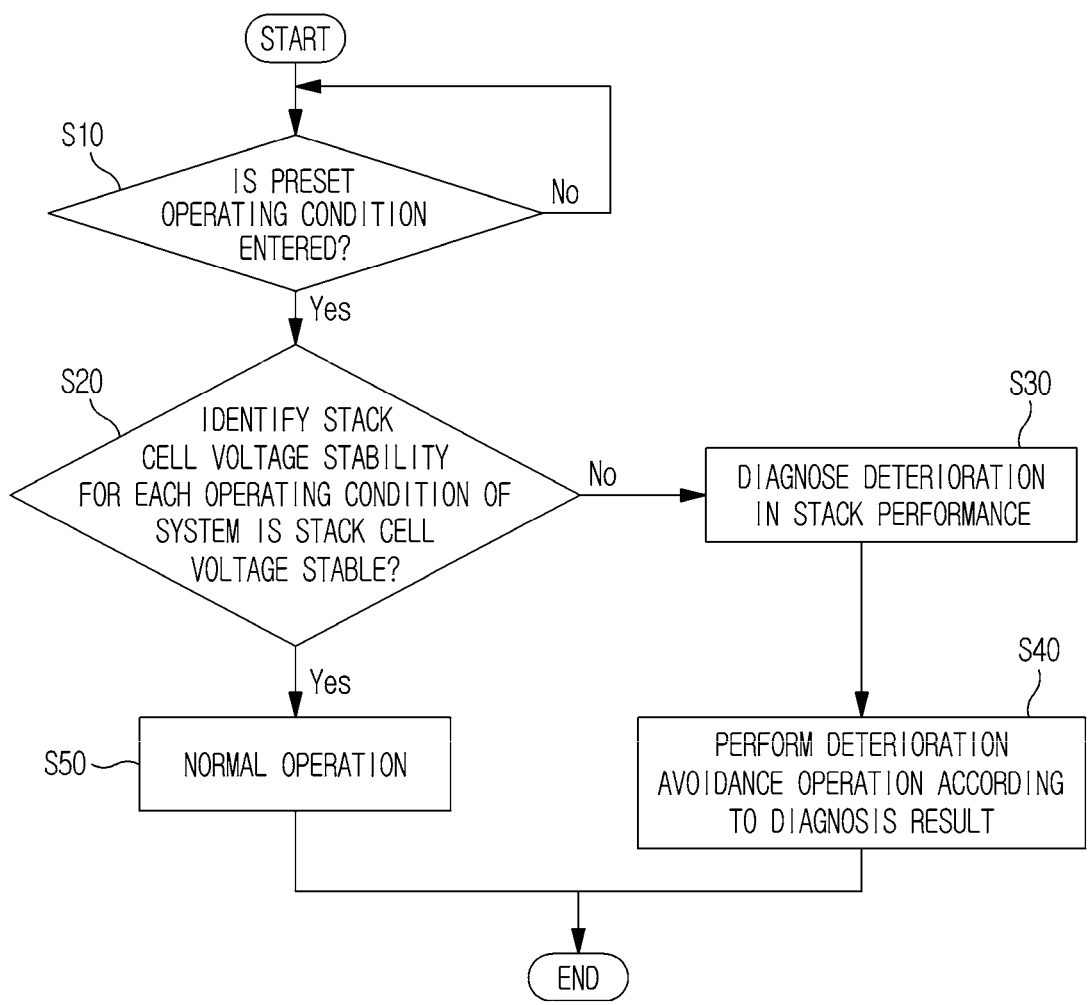
FIG. 3 is a flowchart of a method of diagnosing deterioration of a fuel cell and a method of preventing deterioration of a fuel cell using the same, according to an embodiment of the present disclosure.

FIG. 3 is a flowchart of a method of diagnosing deterioration of a fuel cell stack and a method of preventing deterioration of a fuel cell using the same, according to an embodiment of the present disclosure.

Referring to FIG. 3, a method of preventing deterioration of a fuel cell according to an exemplary embodiment of the present disclosure may include determining whether a fuel cell system has entered a preset operating condition (S10), determining cell voltage stability of a fuel cell stack for each operating condition (S20), diagnosing deterioration in performance of the fuel cell stack S30), and performing a deterioration avoidance operation according to a result of the diagnosing of the deterioration (S40).

Meanwhile, in another embodiment of the present disclosure, except for the performing of the deterioration avoidance operation at S40, only deterioration of the fuel cell may be diagnosed according to a result of the determining of the cell voltage stability of the stack.

Therefore, when the preset operating condition has been entered at S10, current cell voltage stability of the fuel cell stack is determined by a cell voltage stability determination unit at S20, and when a stack cell voltage is stable according to a result of the determining, a normal operation is maintained at S50. In contrast, when the cell voltage stability determination unit determines that a stack cell voltage is unstable, it is considered that there is a temporary performance deterioration or permanent deterioration of the fuel cell stack, and thus, diagnosing of deterioration in performance of the fuel cell stack may be performed by a fuel cell deterioration diagnosing unit at S30.

In the case of the diagnosing of the deterioration in the performance of the stack at S30, controllable variables in the fuel cell system, preferably, a control variable that is preselected from among a control variable group including a supply air recirculation amount, a cathode target stoichiometry ratio (SR), humidifier target temperature, and supply air pressure, may be changed and controlled according to an operating condition. In addition, by monitoring a change in a cell voltage of the fuel cell in response to the changing and controlling of the control variable, stack deterioration information including a cause of deterioration in fuel cell performance, location of occurrence, and whether the deterioration is irreversible may be estimated.

Also, in the method of preventing the deterioration of the fuel cell according to the present disclosure, a deterioration avoidance operation may be performed according to a result of the diagnosing of the deterioration in the performance of the stack. A detailed example of the deterioration avoidance operation according to the result of the diagnosing will be described through a separate embodiment.

According to an exemplary embodiment of the present disclosure, as shown in FIG. 3, only when a preset specific operating condition is entered, stack cell voltage stability is identified. Such operating conditions are limited to a section in which a current density rapidly increases, a high-output section, or a section in which hysteresis may occur while a current density repeatedly rapidly increases/decreases, so as to be suitable for detecting deterioration in performance of a fuel cell.

Figure 4:
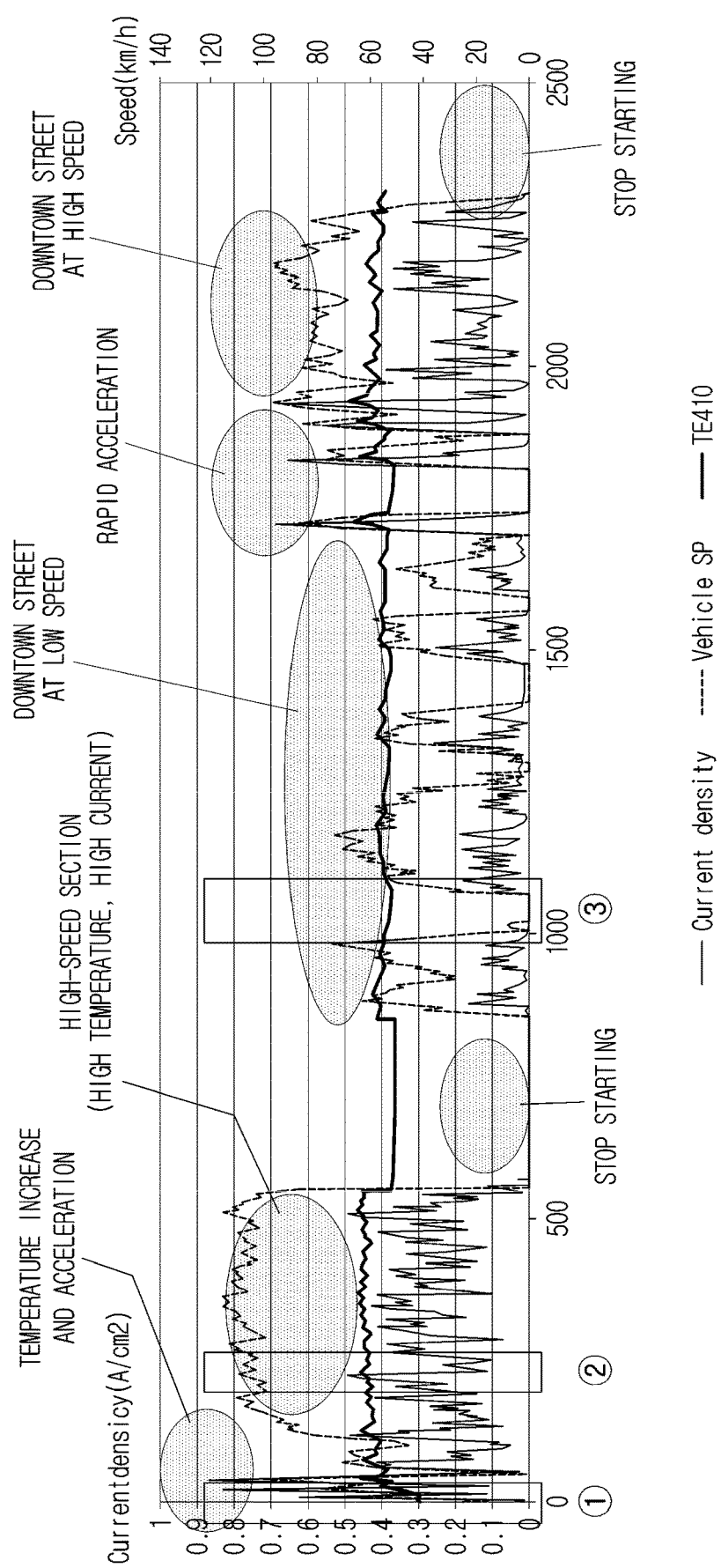
FIG. 4 is a graph showing an operating condition set for diagnosing deterioration of a fuel cell in a vehicle to which a fuel cell system is applied.

Examples of the operating conditions is shown in the graph of FIG. 4.

Specifically, FIG. 4 is a graph showing an operating condition set for diagnosing deterioration of a fuel cell in a vehicle to which a fuel cell system is applied.

Referring to FIG. 4, a first operating condition (① in FIG. 4) is a temperature increase and acceleration section after starting the vehicle, and refers to a section in which the vehicle is driven from an idle state to a high current state. The first operating condition refers to a case in which a first reference current density is reached within a first reference time after starting the fuel cell system, and refers to a case in which a fuel cell stack is heated and accelerated to a high current state within a short time. However, such determination criterion is only an example, and may be applied without limitation as long as it is possible to specify a section in which a temperature increase and acceleration is initially performed after starting the vehicle.

Also a second operating condition (② in FIG. 4) refers to a state in which the fuel cell system is driven in a high temperature and high current state after increasing of temperature of the fuel cell system is completed. The second operating condition refers to a section in which a high-output section is maintained for a sufficient time, such as a case where the fuel cell system is operated at a specific current density or more for more than a second reference time. Therefore, the second operating condition may refer to a condition in which the fuel cell system is operated above a first reference output for more than the second reference time.

However, as described above, a determination criterion for the second operating condition may also be applied without limitation as long as it is possible to specify a state in which a high-temperature and high-current section is maintained at a certain level or more after increasing of temperature of the fuel cell is completed.

Also, a third operating condition (③ in FIG. 4) is immediately after temperature increase and acceleration, and refers to a driving state of the fuel cell stack in which rapid current density changes of "low current→high current" and "high current→low current" are continuously made within a short time, as in section "③" of FIG. 4. In this operating state, hysteresis of stack voltage behavior may be identified. Thus, the third operating condition may refer to a case in which the fuel cell system is operated to repeatedly decrease and increase a current density above preset upper and lower limit values within the second reference time. For example, the third operating condition may refer to a case in which an increase from a second current density to a third current density and a decrease from the third current density to the second current density are repeatedly operated within a third reference time. Here, the second current density and the third current density may be predetermined values suitable for determining hysteresis for voltage behavior.

Figure 5:
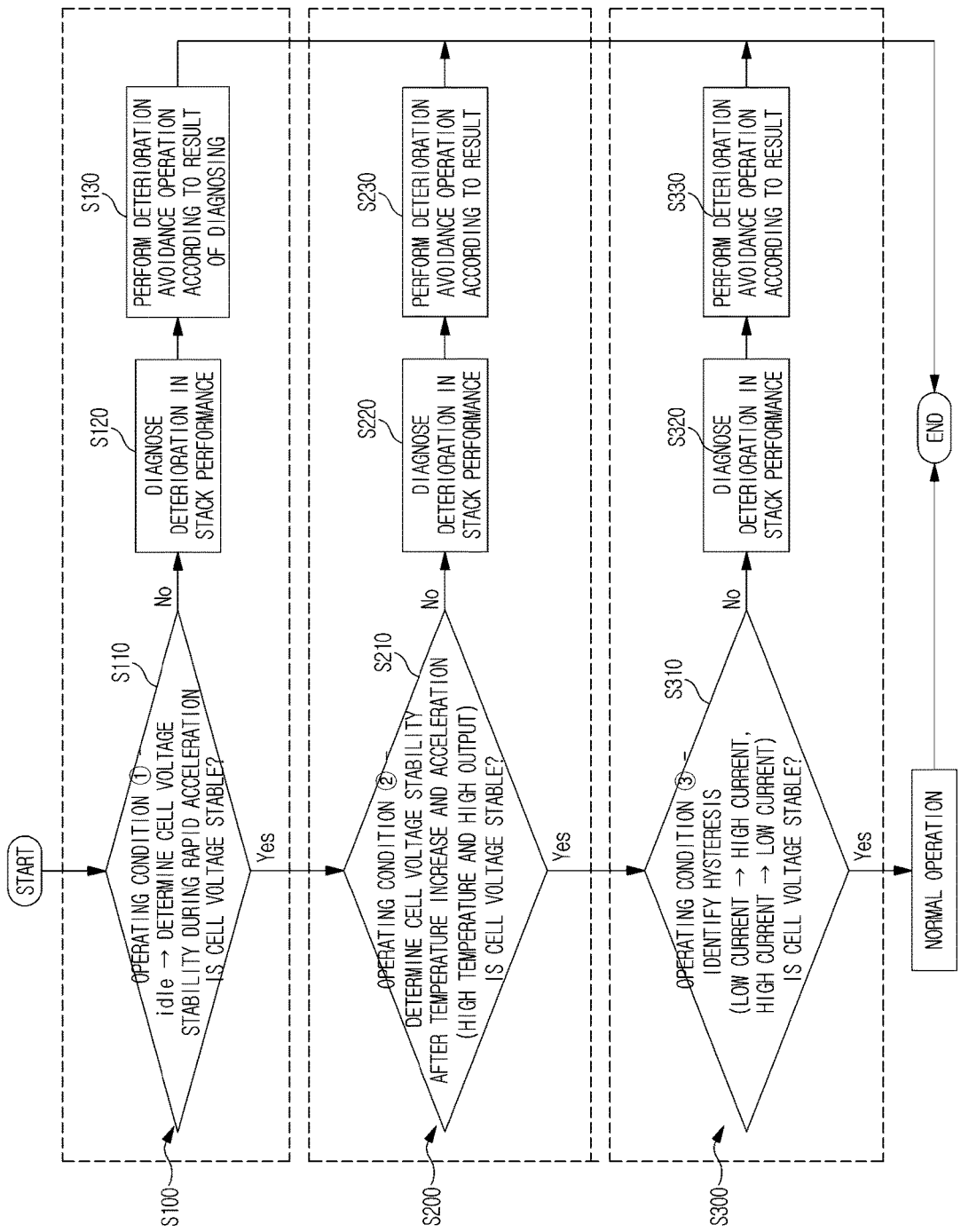
FIG. 5 is a flowchart of a method of diagnosing deterioration of a fuel cell performed for each operating condition and a method of preventing deterioration of a fuel cell using the same, according to an embodiment of the present disclosure.

FIG. 5 is a flowchart sequentially showing processes of diagnosing and preventing deterioration of a fuel cell stack for each operating condition of FIG. 4.

FIG. 5 includes determining cell voltage stability of the fuel cell stack for each operating condition, diagnosing deterioration in performance of the fuel cell stack, and performing a deterioration avoidance operation according to a result of the diagnosing of the deterioration, as shown in FIG. 3. However, an example of FIG. 5 is characterized in that it includes diagnosing stack performance deterioration for each of operating conditions and performing a deterioration avoidance operation.

Processes of diagnosing and preventing deterioration for each operating condition are indicated by S100, S200, and S300, and S100, S200, and S300 may be performed independently or may be integrated and performed, as shown in FIG. 5.

FIG. 5 is an example in which these operations are integrally performed, and is an example in which whether each operating condition is entered is detected in real-time after starting a fuel cell system, and when a specific operating condition is entered, cell voltage stability identification for the corresponding operating condition, stack performance deterioration diagnosis, and deterioration avoidance operation are performed according to a driving state of the fuel cell system.

In contrast, in an another embodiment, a process of determining whether one or two operating conditions among three exemplified operating conditions is entered and diagnosing stack performance deterioration may be optionally performed.

In operation S110 for the first operating condition, when the first reference current density is reached within the first reference time after starting the fuel cell system (during rapid acceleration in an idle state), cell voltage stability may be determined. In this case, the cell voltage stability for the first operating condition may be determined by identifying initial average cell voltage stability during temperature increase and acceleration after the starting thereof. For example, in S110, a difference value ($\Delta V$) between an "average cell voltage" in the stack and a "minimum cell voltage" in the stack in a current high current state may be extracted, and cell voltage stability may be determined from the difference value ($\Delta V$). Particularly, when the difference value ($\Delta V$) between the average cell voltage and the minimum cell voltage is less than a threshold (for example, about 10 mV), it may be determined that cell voltage is stable. In contrast, when the difference value ($\Delta V$) is greater than or equal to the threshold, it is considered that cell voltage is unstable, and thus, a process of diagnosing deterioration in stack performance for the first operating condition and a relevant deterioration avoidance operation may be performed.

In operation S210 for the second operating condition, as in the case where the fuel cell system is operated above the first reference output for more than the second reference time, voltage stability may be identified in a section where high output is maintained for a certain period of time after rapid acceleration. Particularly, in this operation, voltage stability in a high-output section after rapid acceleration compared to a day ago may be identified. In this case, average cell voltage information of a previous day stored in a data storage unit may be utilized.

To this end, in S210, average cell voltage information of a preceding day (n−1 day) and current average cell voltage information of today (n day) are obtained under the same operating condition, and when a difference value between an average cell voltage value of the preceding day (n−1 day) and an average cell voltage value of today (n day) is less than a threshold (e.g., about 5 mV), it may be determined that cell voltage is stable. In contrast, when a difference value between an average cell voltage value of the preceding day (n−1 day) and an average cell voltage value of today (n day) is greater than or equal to a reference value, it is considered that cell voltage is unstable, and thus, a process of diagnosing deterioration in stack performance for the second operating condition and a relevant deterioration avoidance operation may be performed.

Therefore, in operation S210, a current average cell voltage in a high-output section is calculated, and as cell voltage stability is determined from a difference between the calculated current average cell voltage and an average cell voltage in the same section during previous operation, voltage stability after rapid acceleration compared to a previous day may be identified.

In operation S310 for the third operating condition, voltage stability is identified from a minimum cell voltage difference by comparing low current cell voltages in a hysteresis situation.

To this end, in S310, as shown in section "③" of FIG. 4, when rapid current density changes of "low current→high current" and "high current→low current" are continuously made within a short time, voltage stability is determined from a difference value between a minimum cell voltage when there is an increase at a low current and a minimum cell voltage when there is a decrease at the low current. Particularly, in this operation, cell voltage stability may be directly determined from a difference value between a minimum cell voltage during an increase and a minimum cell voltage during a decrease, and preferably, cell voltage stability may be determined according to a comparison result with the difference value calculated in the third operating condition on an immediately preceding day. Therefore, when the fuel cell system is repeatedly operated to increase from the second current density to the third current density and decrease from the third current density to the second current density within the third reference time, the cell voltage stability is determined from a difference between a minimum cell voltage at a fourth current density when a current density decreases and a minimum cell voltage at the fourth current density when the current density increases. In this regard, the fourth current density is a current density value suitable for identifying hysteresis between the second current density and the third current density, and the fourth current density may be set to 0.32 A/cm$^2$ as in operation S311 of FIG. 12.

Table 1 below describes possible causes of performance deterioration when it is determined that cell voltage is unstable in the first to third operating conditions and diagnostic operating conditions that may be considered, and FIGS. 6 to 9 are graphs showing detailed examples of fuel cell performance deterioration.

TABLE 1

|  | Possible cause of performance deterioration | Diagnostic operating condition |
| --- | --- | --- |
| First operating condition | Imbalance of mass transfer in cell (reversible deterioration)<br>Cathode electrode deterioration (irreversible deterioration)<br>GDL, MPL water repellency deterioration (irreversible deterioration)<br>Temporary blockage of cathode separator flow path (reversible deterioration) | a. Increase in cathode flow recirculation ratio<br>b. Increase in cathode flow (inlet) |

TABLE 1-continued

| | Possible cause of performance deterioration | Diagnostic operating condition |
|---|---|---|
| Second operating condition | Performance deterioration (reversible deterioration) due to imbalance of water balance in cell (localized flooding/dry) | c. Increase/decrease in supply gas humidification amount (controlling of temperature of humidifier) |
| Third operating condition | Occurrence of flooding (anode flooding or cathode flooding) in cell (reversible deterioration) | d. Increase in cathode pressure (anode < cathode)<br>e. Changing of hydrogen recirculation ratio |

Figure 6:
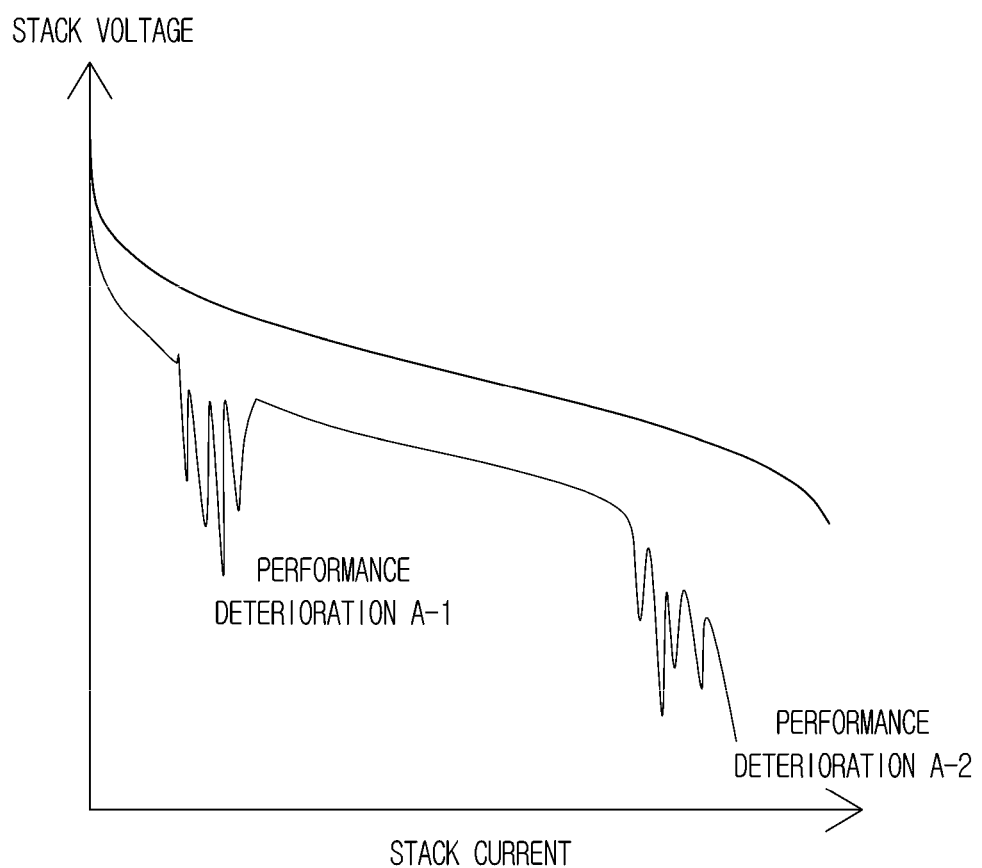
FIG. 6 is a graph showing an example of deterioration in fuel cell performance.

Meanwhile, FIG. 6 shows an example of performance deterioration due to flooding. Referring to FIG. 6, A-1 of FIG. 6 is an example of performance deterioration caused by flooding due to non-uniformity of gas supply between cells due to a low flow rate and a large amount of residual water. Also, A-2 is an example of performance deterioration caused by increased mass transfer resistance at a high flow rate and high current due to flooding.

First, in the case of A-1, performance deterioration may be diagnosed based on whether a high current voltage is restored by recirculating some of cathode outlet air to increase a total air flow rate. Accordingly, when performance deterioration is diagnosed, it is presumed that the performance deterioration has occurred due to temporary flooding in a cathode separator flow path, and in order to avoid the deterioration, only during rapid acceleration after idle, air supercharging may be performed temporarily compared to an existing cathode target stoichiometry ratio (SR). Through such deterioration avoidance control, temporary flooding in the cathode separator flow path may be eliminated.

Also, in both cases of A-1 and A-2, performance deterioration may be diagnosed according to whether a high current voltage is restored by increasing a cathode target SR. Accordingly, when performance deterioration is diagnosed, a cause may be estimated as cathode electrode deterioration (corrosion of carbon support) or deterioration in water repellency of a gas diffusion layer (GDL) and a microporous layer (MPL). In this case, in order to avoid deterioration, operation may be performed under an air supercharging condition of 1.0 A/cm$^2$ or more compared to the existing one.

Figure 7:
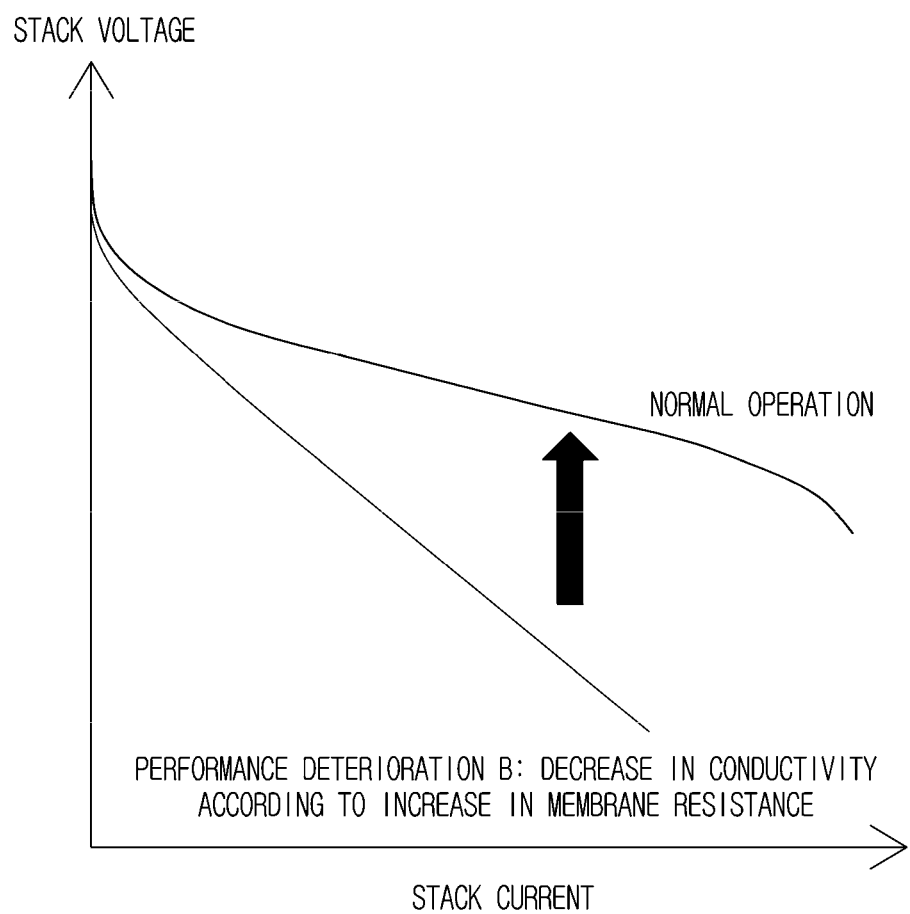
FIG. 7 is a graph showing another example of deterioration in fuel cell performance.

FIG. 7 is a graph showing another example of deterioration in fuel cell performance.

In the case of performance deterioration B, it is estimated that dryness has occurred in a cell, leading to a decrease in conductivity due to an increase in membrane resistance.

In this case, deterioration may be diagnosed according to whether performance is improved by simply increasing relative humidity (RH) as a target temperature of a humidifier is increased. Through the diagnosis, it may be estimated that dryness has occurred throughout the cell, and an increase in membrane/electrode resistance due to drying may be prevented through a deterioration avoidance operation that temporarily increases an amount of air humidification during high-temperature and high-output operation.

Meanwhile, the example of FIG. 7 may perform diagnosis by identifying whether performance is improved by increasing pressure of cathode supply air. Through the diagnosis, it may be estimated that deterioration in the performance is caused by insufficient back-diffusion of cathode-generated water to an anode. After diagnosing stack performance deterioration by increasing cathode air pressure, different deterioration avoidance operations may be performed according to whether a water level of an anode water trap is increased.

That is, when there is no increase in the water level of the anode water trap, in order to prevent cathode flooding or anode drying, by increasing air pressure while maintaining air humidification temperature during high-output operation, a control is made to avoid imbalance of water balance due to back-diffusion of the cathode-generated water to the anode.

Meanwhile, when the water level of the anode water trap is increased, anode flooding may be prevented by increasing pure hydrogen by reducing a hydrogen recirculation ratio.

Figure 8:
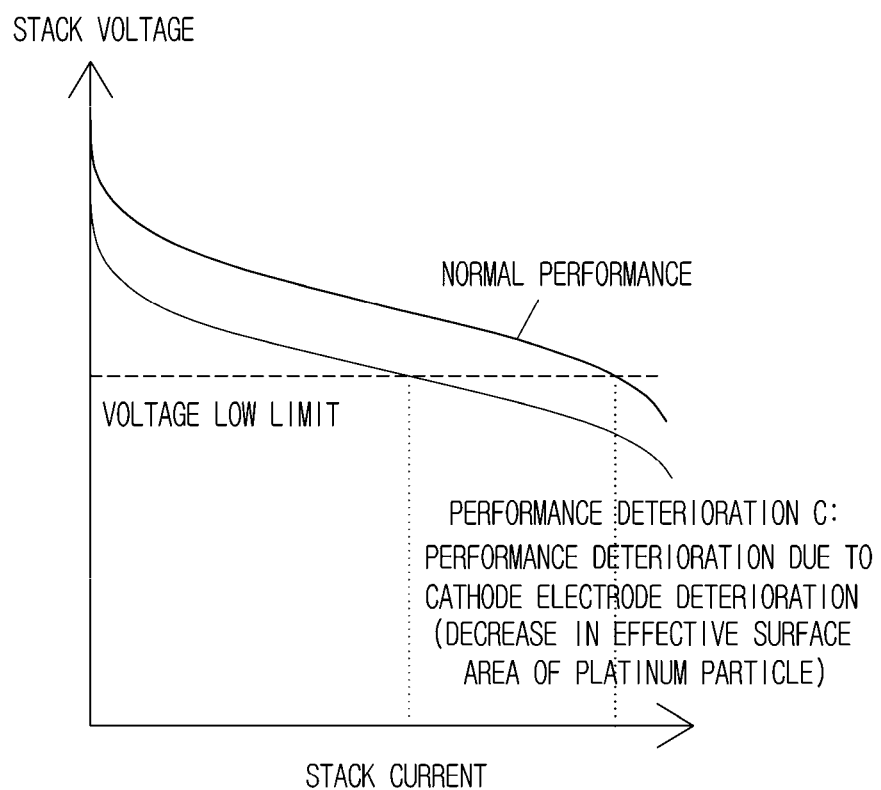
FIG. 8 is a graph showing another example of deterioration in fuel cell performance.

Next, FIG. 8 is a graph showing another example of deterioration in fuel cell performance, and shows an example of deterioration of a cathode electrode.

When the cathode electrode is deteriorated, as an effective surface area of a platinum particle is reduced, performance deterioration C as shown in FIG. 8 occurs. In the case of the performance deterioration C, performance is not restored even when a cathode target SR increased, and whether deterioration has occurred may be diagnosed by improving the cathode target SR. When the performance deterioration C is diagnosed, a deterioration avoidance operation may be performed to limit high-output operation that may be exposed to an excessively low voltage in order to avoid further deterioration.

Figure 9:
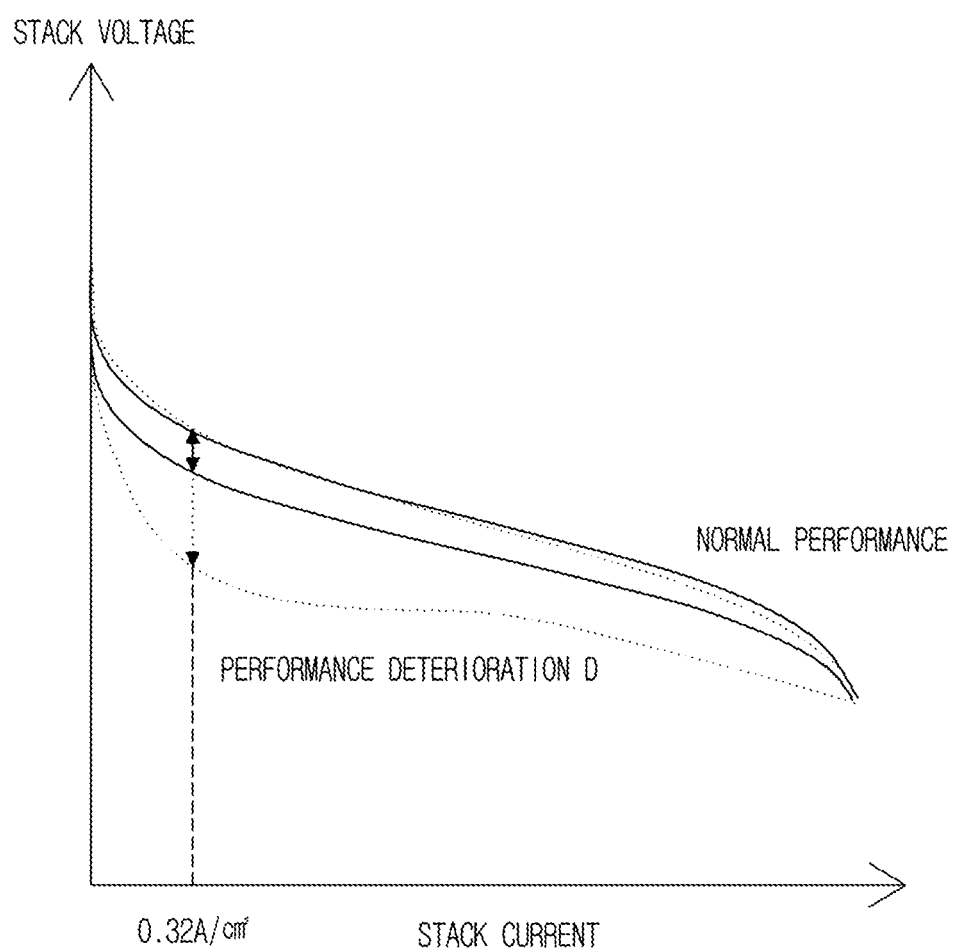
FIG. 9 is a graph showing another example of deterioration in fuel cell performance.

Also, FIG. 9 is a graph showing another example of deterioration in fuel cell performance.

In FIG. 9, in diagnosing a cause of an increase in hysteresis, it may be determined that whether temporary flooding in a flow path or deterioration in water repellency has progressed.

Specifically, in diagnosing of deterioration in stack performance, whether deteriorated performance is improved may be identified by reducing a target temperature of a humidifier. Through the diagnosis, it is estimated that a cause of the deterioration in the performance cathode flooding due to deterioration in water repellency (a decrease in hydrophobicity, an increase in hydrophilicity) of a gas diffusion layer and a microporous layer. In this case, in order to avoid deterioration due to cathode flooding, controlling of temporarily reducing an amount of air humidification during a subsequent high-output operation and then restoring may be performed.

Meanwhile, during the diagnosing of the deterioration in the stack performance related to FIG. 9, whether the performance is improved may be identified by increasing pressure of supply air. Through the diagnosis, it is estimated that local flooding and drying occurs in the cell, resulting in deterioration in the performance. In this case, in order to avoid imbalance in water balance, a deterioration avoidance operation may be performed to increase pressure while air humidification temperature is maintained during a subsequent high-output operation.

Figure 10:
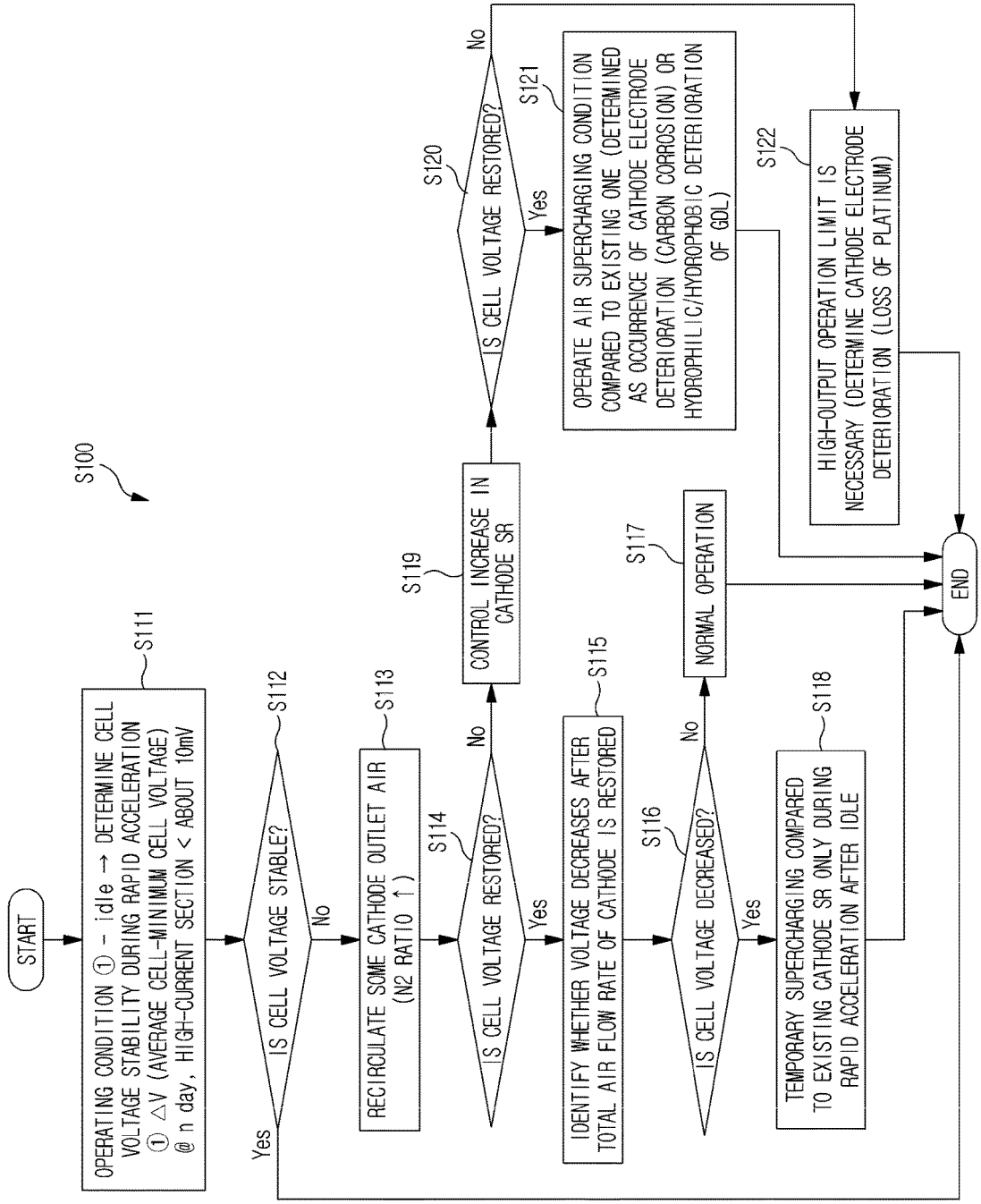
FIG. 10 is a flowchart of a method of diagnosing deterioration of a fuel cell according to a first operating condition and a method of preventing deterioration of a fuel cell using the same, according to an embodiment of the present disclosure.
Figure 11:
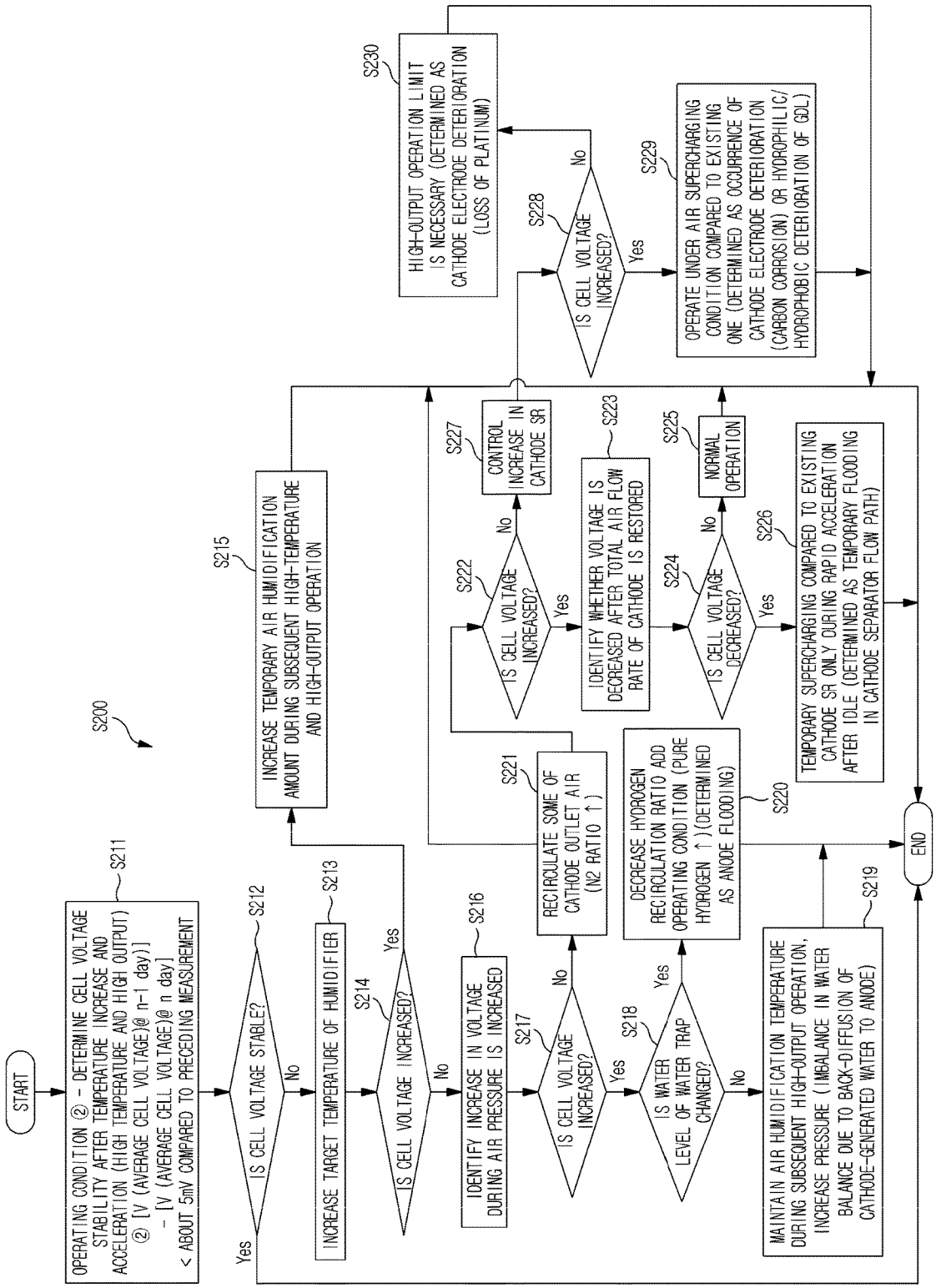
FIG. 11 is a flowchart of a method of diagnosing deterioration of a fuel cell according to a second operating condition and a method of preventing deterioration of a fuel cell using the same, according to an embodiment of the present disclosure.
Figure 12:
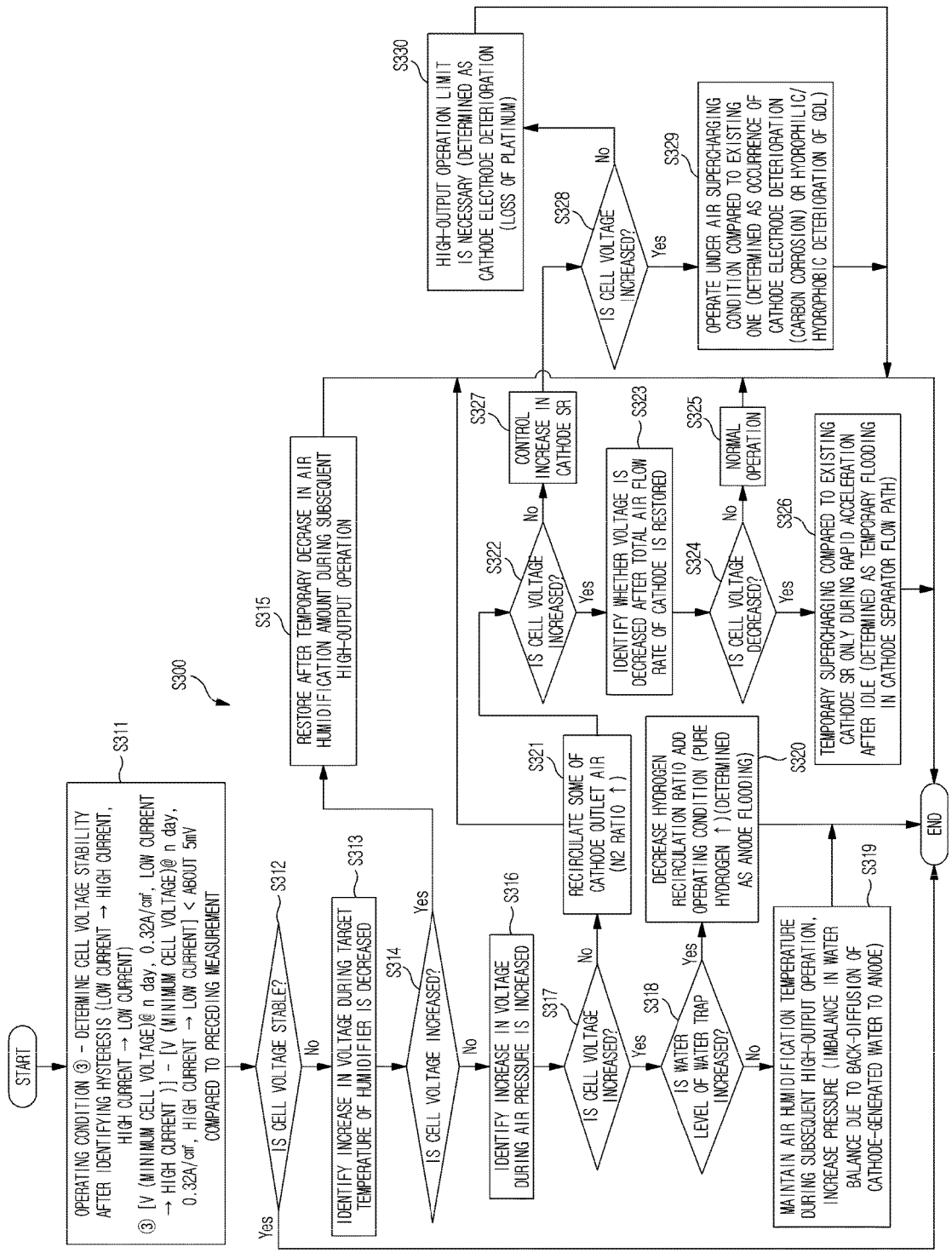
FIG. 12 is a flowchart of a method of diagnosing deterioration of a fuel cell according to a third operating condition and a method of preventing deterioration of a fuel cell using the same, according to an embodiment of the present disclosure.

Based on the details above, FIGS. 10 to 12 show methods of diagnosing and preventing deterioration of a fuel cell stack according to the first to third operating conditions, respectively. As those described with reference to FIG. 5, methods of diagnosing and preventing deterioration of a fuel cell according to the operating conditions, which are respectively shown in FIGS. 10 to 12, may be separately performed, or two or more of them may be integrally performed.

FIG. 10 is a flowchart of a method of diagnosing deterioration of a fuel cell stack according to a first operating condition and a method of preventing deterioration of a fuel cell using the same, according to an embodiment of the present disclosure at S100.

As shown in FIG. 10, it is identified that the first operating condition is entered, and an operation of determining cell voltage stability for the first operating condition is performed at S111. When it is determined that cell voltage is stable through operation S111, a diagnostic logic is terminated, and when it is determined that cell voltage is unstable, stack performance deterioration diagnosis and deterioration avoidance operation after S113 are performed.

In this regard, in diagnosing of deterioration in stack performance, a flow rate of cathode supply air is increased to identify whether a minimum cell voltage is restored within a stable range, and a diagnosis result including at least one piece of deterioration information including a cause of deterioration in fuel cell performance, location of occurrence, and whether the deterioration is irreversible is provided.

Specifically, when it is determined that cell voltage is unstable through operation S111, some of cathode outlet air is recirculated (an N2 ratio is increased) to increase a total flow rate of cathode supply air (S113), and whether a minimum cell voltage is restored within a stable range is identified (S114). In this case, an amount of air recirculated to a cathode side may be increased by controlling an opening amount of an air recirculation valve. When it is identified that a difference value (ΔV) between an "average cell voltage" in the stack and the "minimum cell voltage" in the stack, which is re-calculated according to the recirculating of the cathode outlet air, is less than a threshold (e.g., about 10 mV), it may be determined that the minimum cell voltage is restored within the stable range. More simply, it may be determined only by an amount of an increase in the minimum cell voltage by monitoring only a change in the minimum cell voltage. In this case, a cause of destabilizing the cell voltage may be estimated as temporary flooding in a cathode separator flow path.

When the minimum cell voltage is restored within the stable range, whether the minimum cell voltage remains within the stable range may be identified while the total flow rate of the cathode supply air is restored at S115 and S116. If there is a case where the minimum cell voltage does not decrease again in response to the restoring of the total flow rate of the cathode supply air, it is considered that performance deterioration is resolved, thereby proceeding a normal operation at S117.

In contrast, when the minimum cell voltage decreases again, the minimum cell voltage may not remain within the stable range, and thus, a deterioration avoidance operation, in which a control condition is changed to make a change into a temporary supercharging state by temporarily increasing an existing cathode target stoichiometry ratio (SR) only during rapid acceleration in an idle state, may be performed at S118. Through such control, temporary flooding in a cathode separator flow path is resolved, and then a fuel cell system is operated in the same manner as before.

Meanwhile, in operations S113 and S114, when the minimum cell voltage is not restored within the stable range by recirculating the some of the cathode outlet air, the target SR of the air supplied to the cathode may be increased at S119, and whether the minimum cell voltage is restored within the stable range may be reidentified at S120).

As a result of the reidentifying, when the minimum cell voltage is restored, it may be estimated that performance deterioration is caused by occurrence of cathode electrode deterioration (carbon corrosion) or hydrophilic/hydrophobic degradation of a gas diffusion layer (GDL), and an avoidance operation may be performed so that a high current air supercharging operation may be made to avoid further deterioration. Thus, in the fuel cell system, a deterioration avoidance operation for making a change into an air supercharging condition according to a target SR increased compared to the existing one may be performed (S121).

In contrast, as a result of the reidentifying, when the minimum cell voltage is not restored, it may be estimated that performance deterioration has occurred for reasons such as cathode electrode deterioration (loss of platinum), and control may be performed to limit high-output operation to avoid further deterioration. Thus, in the fuel cell system, output of the fuel cell may be limited so as not to operate above a preset output value (S122).

FIG. 11 is a flowchart of a method of diagnosing deterioration of a fuel cell stack according to a second operating condition and a method of preventing deterioration of a fuel cell using the same, according to an embodiment of the present disclosure (S200).

As shown in FIG. 11, it is identified that the second operating condition is entered, and an operation of determining cell voltage stability for the second operating condition is performed at S211. When it is determined that cell voltage is stable through operation S211, a diagnostic logic is terminated, and when it is determined that cell voltage is unstable, stack performance deterioration diagnosis and deterioration avoidance operation after S213 are performed.

In this regard, in diagnosing of deterioration in stack performance, whether an average cell voltage is increased within a stable range is identified while increasing a humidification amount of cathode supply gas, increasing cathode supply gas pressure, and decreasing a hydrogen recirculation ratio are sequentially performed, and a diagnosis result including at least one piece of deterioration information including a cause of deterioration in fuel cell performance, location of occurrence, and whether the deterioration is irreversible may be provided.

Specifically, when it is determined that cell voltage is unstable through operations S211 and S212, a target temperature of a humidifier is increased at S213, and whether a current average cell voltage is increased within a stable range is identified at S214. When it is identified that a difference value between an average cell voltage value of a preceding day (n−1 day) and a current average cell voltage value of today (n day), which is re-calculated according to the increasing of the target temperature of the humidifier, is less than a reference value (e.g., 5 mV), it may be determined that the current average cell voltage is increased within the stable range. In this case, a cause of destabilizing the cell voltage may be estimated to be due to imbalance in water balance due to local drying inside the cell.

Thus, when the current average cell voltage is increased within the stable range by increasing the target temperature of the humidifier, it may be changed to perform a deterioration avoidance operation for temporarily increasing an amount of air humidification during a subsequent high-temperature and high-output operation in order to prevent an increase in membrane/electrode resistance due to drying at S215.

In contrast, in a case where the current average cell voltage is not increased within the stable range even when the target temperature of the humidifier is increased, a pressure of cathode supply air is increased at S216, and whether the current average cell voltage is increased within the stable range may be reidentified at S217.

As a result of the reidentifying, when the current average cell voltage is increased within the stable range, a change in a water level of a water trap on an anode side may be identified at S218. When there is no change in the water level of the water trap, cathode-generated water may be controlled to be back-diffused to the anode to avoid the imbalance in the water balance. To this end, when there is no change in the water level of the water trap, a deterioration avoidance operation for increasing a pressure of the supply air while maintaining air humidification temperature during a high-output operation exceeding reference output may be performed at S219. Thus, cathode flooding or anode drying may be prevented by avoiding the imbalance in the water balance.

In contrast, when the water level of the water trap is increased, it may be determined that prevention of anode flooding is necessary, such that a deterioration avoidance operation may be performed to reduce an anode hydrogen recirculation ratio at S220.

Meanwhile, when it is determined that the current average cell voltage is not improved within the stable range through operations S216 and S217, some of cathode outlet air is recirculated (an N2 ratio is increased) to increase a total flow rate of the cathode supply air at S221, and whether the average cell voltage is increased within the stable range may be reidentified at S222.

When the current average cell voltage is increased within the stable range, the total flow rate of the cathode supply air is restored at S223, and whether the average cell voltage is decreased again may be identified at S224. If there is a case where the average cell voltage is not decreased and remains within the stable range in response to the restoring of the total flow rate of the cathode supply air, a normal operation may be performed at S225. In contrast, when the average cell voltage is decreased and does not remain within the stable range, a deterioration avoidance operation, in which a control condition is changed to make a change into a temporary supercharging state by temporarily increasing an existing cathode target stoichiometry ratio (SR) only during rapid acceleration in an idle state, may be performed at S226. Through such control, temporary flooding in a cathode separator flow path is resolved, and then a fuel cell system is operated in the same manner as before.

Despite of controlling of the recirculating of the cathode outlet air at S221, when it is determined that the current average cell voltage is not increased within the stable range in operation S222, a target SR of air supplied to a cathode is increased at S227, and whether the current average cell voltage is increased within the stable range may be reidentified at S228.

As a result of the reidentifying, when the current average cell voltage is increased within the stable range, it may be estimated that performance deterioration is caused by occurrence of cathode electrode deterioration (carbon corrosion) or hydrophilic/hydrophobic degradation of a gas diffusion layer (GDL), and an avoidance operation may be performed so that a high current air supercharging operation may be made to avoid further deterioration. Thus, in the fuel cell system, a deterioration avoidance operation for making a change into an air supercharging condition according to a target SR increased compared to the existing one may be performed at S229.

In contrast, as a result of the reidentifying, when the current average cell voltage is not increased, it may be estimated that performance deterioration has occurred for reasons such as cathode electrode deterioration (loss of platinum), and control may be performed to limit high-output operation to avoid further deterioration. Thus, in the fuel cell system, output of the fuel cell may be limited so as not to operate above a preset output value at S230.

FIG. 12 is a flowchart of a method of diagnosing deterioration of a fuel cell stack according to a third operating condition and a method of preventing deterioration of a fuel cell using the same, according to an embodiment of the present disclosure (operation S300).

As shown in FIG. 11, when it is identified that the third operating condition is entered, an operation of determining cell voltage stability for the third operating condition is performed at S311). When it is determined that cell voltage is stable through operation S311, a diagnostic logic is terminated, and when it is determined that cell voltage is unstable, stack performance deterioration diagnosis and deterioration avoidance operation after S313 are performed.

In this regard, in diagnosing of deterioration in stack performance, whether a minimum cell voltage is increased within a stable range is identified while decreasing a humidification amount of cathode supply gas, increasing cathode supply gas pressure, and decreasing a hydrogen recirculation ratio are sequentially controlled, and a diagnosis result including at least one piece of deterioration information including a cause of deterioration in fuel cell performance, location of occurrence, and whether the deterioration is irreversible may be provided.

Specifically, when it is determined that cell voltage is unstable through operations S311 and S312, a target temperature of a humidifier is decreased at S313, and whether a minimum cell voltage is increased may be identified at S314. In this case, when the current cell average voltage is increased within the stable range by decreasing the target temperature of the humidifier, a cause of destabilizing the cell voltage may be estimated to be due to cathode flooding. Therefore, in order to prevent deterioration due to the cathode flooding, an amount of air humidification may be temporarily reduced and then changed and controlled to be restored during a high-output operation exceeding reference output at S315.

In contrast, in a case where the minimum cell voltage is not increased within the stable range even when the target temperature of the humidifier is decreased, a pressure of cathode supply air is increased at S316, and whether the minimum cell voltage is increased within the stable range may be reidentified at S317.

As a result of the reidentifying, when the minimum cell voltage is increased within the stable range, a change in a water level of a water trap on an anode side may be identified at S318. When there is no change in the water level of the water trap, it is estimated that imbalance in water balance may occur due to back-diffusion of cathode-generated water to the anode. Thus, an operation for preventing cathode flooding or anode drying by avoiding the imbalance in the water balance is necessary. To this end, when there is no change in the water level of the water trap, a deterioration avoidance operation for increasing a pressure of the supply air while maintaining air humidification temperature during a high-output operation exceeding reference output may be performed at S319.

In contrast, when the water level of the water trap is increased, it may be determined that prevention of anode flooding is necessary, such that a deterioration avoidance operation may be performed to reduce an anode hydrogen recirculation ratio at S320.

Meanwhile, when it is determined that the minimum cell voltage is not improved within the stable range through operations S316 and S317, some of cathode outlet air is recirculated (an N2 ratio is increased) to increase a total flow rate of the cathode supply air at S321, and whether the minimum cell voltage is increased within the stable range may be reidentified at S322.

When the minimum cell voltage is increased within the stable range, the total flow rate of the cathode supply air is restored at S323, and whether the minimum cell voltage is decreased again may be identified at S324. If there is a case where the minimum cell voltage is not decreased and remains within the stable range in response to the restoring of the total flow rate of the cathode supply air, a normal operation may be performed at S325. In contrast, when the minimum cell voltage is decreased and does not remain within the stable range, a deterioration avoidance operation, in which a control condition is changed to make a change into a temporary supercharging state by temporarily increasing an existing cathode target stoichiometry ratio (SR) only during rapid acceleration in an idle state, may be performed at S326. Through such control, temporary flooding in a cathode separator flow path is resolved, and then a fuel cell system is operated in the same manner as before.

Despite of controlling of the recirculating of the cathode outlet air at S321, when it is determined that the current average cell voltage is not increased within the stable range in operation S322, a target SR of air supplied to a cathode is increased at S327, and whether the current average cell voltage is increased within the stable range may be reidentified at S328.

As a result of the reidentifying, when the minimum cell voltage is increased within the stable range, it may be estimated that performance deterioration is caused by occurrence of cathode electrode deterioration (carbon corrosion) or hydrophilic/hydrophobic degradation of a gas diffusion layer (GDL), and an avoidance operation may be performed so that a high current air supercharging operation may be made to avoid further deterioration. Thus, in the fuel cell system, a deterioration avoidance operation for making a change into an air supercharging condition according to a target SR increased compared to the existing one may be performed at S329.

In contrast, as a result of the reidentifying, when the minimum cell voltage is not increased, it may be estimated that performance deterioration has occurred for reasons such as cathode electrode deterioration (loss of platinum), and control may be performed to limit high-output operation to avoid further deterioration. Thus, in the fuel cell system, output of the fuel cell may be limited so as not to operate above a preset output value at S330.

Although shown and described with respect to specific embodiments of the present disclosure, it will be apparent to those skilled in the art that the present disclosure may be variously improved and changed without departing from the spirit of the present disclosure provided by the following claims.

The invention claimed is:

1. A method of diagnosing deterioration of a fuel cell, the method comprising:
   determining whether a fuel cell system has entered a preset operating condition;
   determining cell voltage stability for the preset operating condition; and
   when it is determined that a cell voltage is not stable, diagnosing the deterioration of the fuel cell by changing and controlling a control variable selected according to the operating condition selected from among a control variable group including a supply air recirculation amount, a cathode target stoichiometry ratio (SR), humidifier target temperature, and supply air pressure, and monitoring a resultant change in the cell voltage of the fuel cell;
   wherein the determining of the cell voltage stability comprises at least one of:
   (i) determining the cell voltage stability from a difference between an average cell voltage and a minimum cell voltage at a time point at which a first current density is reached within a first reference time after starting the fuel cell system;
   (ii) when the fuel cell system is operated above a first reference output for more than a second reference time, calculating a current average cell voltage in a corresponding section, and determining the cell voltage stability from a difference between the calculated current average cell voltage and an average cell voltage in an identical section during a previous operation; and
   (iii) when the fuel cell system is repeatedly operated to increase from a second current density to a third current density and decrease from the third current density to the second current density within a third reference time, determining the cell voltage stability from a difference between a minimum cell voltage at a fourth current density when a current density decreases and a minimum cell voltage at the fourth current density when the current density increases.

2. The method of claim 1, wherein, when it is determined that the cell voltage is unstable via (i), in the diagnosing of the deterioration of the fuel cell, a flow rate of cathode supply air is increased to identify whether the minimum cell voltage is restored within a stable range, and a diagnosis result including at least one piece of deterioration information including a cause of deterioration in fuel cell performance, location of occurrence, and whether the deterioration is irreversible is provided.

3. The method of claim 1, wherein, when it is determined that the cell voltage is unstable via (ii), in the diagnosing of the deterioration of the fuel cell, whether the average cell voltage is increased within a stable range is identified while increasing a humidification amount of cathode supply gas, increasing cathode supply gas pressure, and decreasing a hydrogen recirculation ratio are sequentially performed, and a diagnosis result including at least one piece of deterioration information including a cause of deterioration in fuel cell performance, location of occurrence, and whether the deterioration is irreversible is provided.

4. The method of claim 1, wherein, when it is determined that the cell voltage is unstable via (iii), in the diagnosing of the deterioration of the fuel cell, whether the minimum cell voltage is increased within a stable range is identified while decreasing a humidification amount of cathode supply gas, increasing cathode supply gas pressure, and decreasing a hydrogen recirculation ratio are sequentially controlled, and a diagnosis result including at least one piece of deterioration information including a cause of deterioration in fuel cell performance, location of occurrence, and whether the deterioration is irreversible is provided.

5. A method of preventing deterioration of a fuel cell, the method comprising:
   determining whether a fuel cell system has entered a preset operating condition;
   determining cell voltage stability for the preset operating condition;
   when it is determined that a cell voltage is not stable, diagnosing the deterioration of the fuel cell by changing and controlling a control variable selected according to the operating condition selected from among a control variable group including a supply air recirculation amount, a cathode target stoichiometry ratio (SR), humidifier target temperature, and supply air pressure, and monitoring a resultant change in the cell voltage of the fuel cell; and
   performing a deterioration avoidance operation according to a result of the diagnosing of the deterioration of the fuel cell;
   wherein the determining of the cell voltage stability comprises at least one of:
   (i) determining the cell voltage stability from a difference between an average cell voltage and a minimum cell voltage at a time point at which a first current density is reached within a first reference time after starting the fuel cell system;
   (ii) when the fuel cell system is operated above a first reference output for more than a second reference time, calculating a current average cell voltage in a corresponding section, and determining the cell voltage stability from a difference between the calculated current average cell voltage and an average cell voltage in an identical section during a previous operation; and
   (iii) when the fuel cell system is repeatedly operated to increase from a second current density to a third current density and decrease from the third current density to the second current density within a third reference time, determining the cell voltage stability from a difference between a minimum cell voltage at a fourth current density when a current density decreases and a minimum cell voltage at the fourth current density when the current density increases.

6. The method of claim 5, wherein, when it is determined that the cell voltage is unstable via (i), in the diagnosing of the deterioration of the fuel cell, whether the minimum cell voltage is restored within a stable range is identified while a total flow rate of cathode supply air is increased by recirculating some of cathode outlet air, and when the minimum cell voltage is restored within the stable range, whether the minimum cell voltage remains within the stable range is identified while the total flow rate of cathode supply air is restored, and
   in the performing of the deterioration avoidance operation, only when the minimum cell voltage does not remain within the stable range, the deterioration avoidance operation for making a change into a temporary supercharging state by temporarily increasing a target SR of air supplied to a cathode under an operating condition of (i) is performed.

7. The method of claim 6, wherein, in the diagnosing of the deterioration of the fuel cell, when the minimum cell voltage is not restored within the stable range by recirculating the some of the cathode outlet air, the target SR of the air supplied to the cathode is increased to reidentify whether the minimum cell voltage is restored within the stable range, and
   in the performing of the deterioration avoidance operation, according to a result of the reidentifying, when the minimum cell voltage is restored, the deterioration avoidance operation for making a change into an air supercharging condition increased to a preset target SR is performed, and when the minimum cell voltage is not restored, output of the fuel cell is controlled to be limited.

8. The method of claim 5, wherein, when it is determined that the cell voltage is unstable via (ii), in the diagnosing of the deterioration of the fuel cell, the humidifier target temperature is increased to identify whether the current average cell voltage is increased within a stable range, and
   in the performing of the deterioration avoidance operation, when the current average cell voltage is increased within the stable range, the deterioration avoidance operation is performed to temporarily increase an air humidification amount under an operating condition exceeding reference temperature and second reference output.

9. The method of claim 8, wherein, in the diagnosing of the deterioration of the fuel cell, when the current average cell voltage is not increased within the stable range by increasing the humidifier target temperature, a pressure of cathode supply air is increased to reidentify whether the current average cell voltage is increased within the stable range, and when the current average cell voltage is increased within the stable range as a result of the reidentifying, a change in a water level of a water trap on an anode side is identified, and
   in the performing of the deterioration avoidance operation, when the water level of the water trap is increased, an anode hydrogen recirculation ratio is changed and controlled to decrease, and when there is no change in the water level of the water trap, the supply air pressure is controlled to increase while air humidification temperature under an operating condition exceeding third reference output is maintained.

10. The method of claim 9, wherein, in the diagnosing of the deterioration of the fuel cell, when the current average cell voltage is not increased within the stable range as the result of the reidentifying, whether the current average cell voltage is increased within the stable range is reidentified while some of cathode outlet air is recirculated to increase a total flow rate of the cathode supply air, and when the current average cell voltage is increased within the stable range, whether the current average cell voltage remains within the stable range is identified while a total flow rate of the cathode supply air is restored, and
   in the performing of the deterioration avoidance operation, only when the current average cell voltage does not remain within the stable range, the deterioration avoidance operation for making a change into a temporary supercharging state by temporarily increasing a target SR of air supplied to a cathode under an operating condition of (i) is performed.

11. The method of claim 10, wherein, in the diagnosing of the deterioration of the fuel cell, when the current average cell voltage is not increased within the stable range by recirculating the some of the cathode outlet air, the target SR of the air supplied to the cathode is increased to reidentify whether the current average cell voltage is increased within the stable range, and
   in the performing of the deterioration avoidance operation, when the current average cell voltage is increased within the stable range according to the increasing of the target SR of the air, the deterioration avoidance operation for making a change into an air supercharging condition increased to a preset target SR is performed, and when the current average cell voltage is not increased, output of the fuel cell is controlled to be limited.

12. The method of claim 5, wherein, when it is determined that the cell voltage is unstable via (iii), in the diagnosing of the deterioration of the fuel cell, the humidifier target temperature is decreased to identify whether the minimum cell voltage is increased within a stable range, and in the performing of the deterioration avoidance operation, when the minimum cell voltage is increased within the stable range, an air humidification amount under an operating condition exceeding fourth reference output is changed and controlled to temporarily decrease.

13. The method of claim 12, wherein, in the diagnosing of the deterioration of the fuel cell, when the minimum cell voltage is not increased within the stable range by decreasing the humidifier target temperature, a pressure of cathode supply air is increased to reidentify whether the minimum cell voltage is increased within the stable range, and when the minimum cell voltage is increased within the stable range as a result of the reidentifying, a change in a water level of a water trap on an anode side is identified, and in the performing of the deterioration avoidance operation, when the water level of the water trap is increased, an anode hydrogen recirculation ratio is changed and controlled to decrease, and when there is no change in the water level of the water trap, the supply air pressure is controlled to increase while air humidification temperature under an operating condition exceeding third reference output is maintained.

14. The method of claim 13, wherein, in the diagnosing of the deterioration of the fuel cell, when the minimum cell voltage is not increased within the stable range as the result of the reidentifying, whether the minimum cell voltage is increased within the stable range is reidentified while some of cathode outlet air is recirculated to increase a total flow rate of the cathode supply air, and when the minimum cell voltage is increased within the stable range, whether the minimum cell voltage remains within the stable range is identified while a total flow rate of the cathode supply air is restored, and in the performing of the deterioration avoidance operation, only when the minimum cell voltage does not remain within the stable range, the deterioration avoidance operation for making a change into a temporary supercharging state by temporarily increasing a target SR of air supplied to a cathode under an operating condition of (i) is performed.

15. The method of claim 14, wherein, in the diagnosing of the deterioration of the fuel cell, when the minimum cell voltage is not increased within the stable range by recirculating the some of the cathode outlet air, the target SR of the air supplied to the cathode is increased to reidentify whether the minimum cell voltage is increased within the stable range, and in the performing of the deterioration avoidance operation, when the minimum cell voltage is increased within the stable range according to the increasing of the target SR of the air, the deterioration avoidance operation for making a change into an air supercharging condition increased to a preset target SR is performed, and when the minimum cell voltage is not increased, output of the fuel cell is controlled to be limited.

16. A fuel cell deterioration prevention system comprising:

a cell voltage stability determination unit determining cell voltage stability according to a preset operating condition;

a fuel cell deterioration diagnosing unit including information on control variables to be changed and controlled when a cell voltage is unstable according to an operating condition selected among a control variable group including a supply air recirculation amount, a cathode target SR, humidifier target temperature, and supply air pressure, and diagnosing deterioration of a fuel cell by changing and controlling a control variable pre-selected according to an operating condition when the cell voltage stability determination unit determines that the cell voltage is unstable, and monitoring a resultant change in the cell voltage of the fuel cell; and a deterioration avoidance operation control unit configured to perform a deterioration avoidance operation based on a diagnosis result of the fuel cell deterioration diagnosing unit;

wherein the determining of the cell voltage stability comprises at least one of:

(i) determining the cell voltage stability from a difference between an average cell voltage and a minimum cell voltage at a time point at which a first current density is reached within a first reference time after starting the fuel cell system;

(ii) when the fuel cell system is operated above a first reference output for more than a second reference time, calculating a current average cell voltage in a corresponding section, and determining the cell voltage stability from a difference between the calculated current average cell voltage and an average cell voltage in an identical section during a previous operation; and (iii) when the fuel cell system is repeatedly operated to increase from a second current density to a third current density and decrease from the third current density to the second current density within a third reference time, determining the cell voltage stability from a difference between a minimum cell voltage at a fourth current density when a current density decreases and a minimum cell voltage at the fourth current density when the current density increases.

17. The fuel cell deterioration prevention system of claim 16, further comprising a data storage unit storing average cell voltage and minimum cell voltage information, which are recorded during operation of a fuel cell system from a preceding day to a current time, for each operating state, wherein the cell voltage stability determination unit is configured to determine the cell voltage stability based on the average cell voltage and minimum cell voltage information stored in the data storage unit.

18. The fuel cell deterioration prevention system of claim 16, wherein the fuel cell deterioration diagnosing unit provides a diagnosis result including at least one piece of deterioration information including a cause of deterioration in full cell performance, location of occurrence, and whether the deterioration is irreversible according to whether a cell voltage stability condition of the fuel cell required according to the operating condition is restored as a result of the changing and controlling of the control variable.

* * * * *